United States Patent Office 3,835,019
Patented Sept. 10, 1974

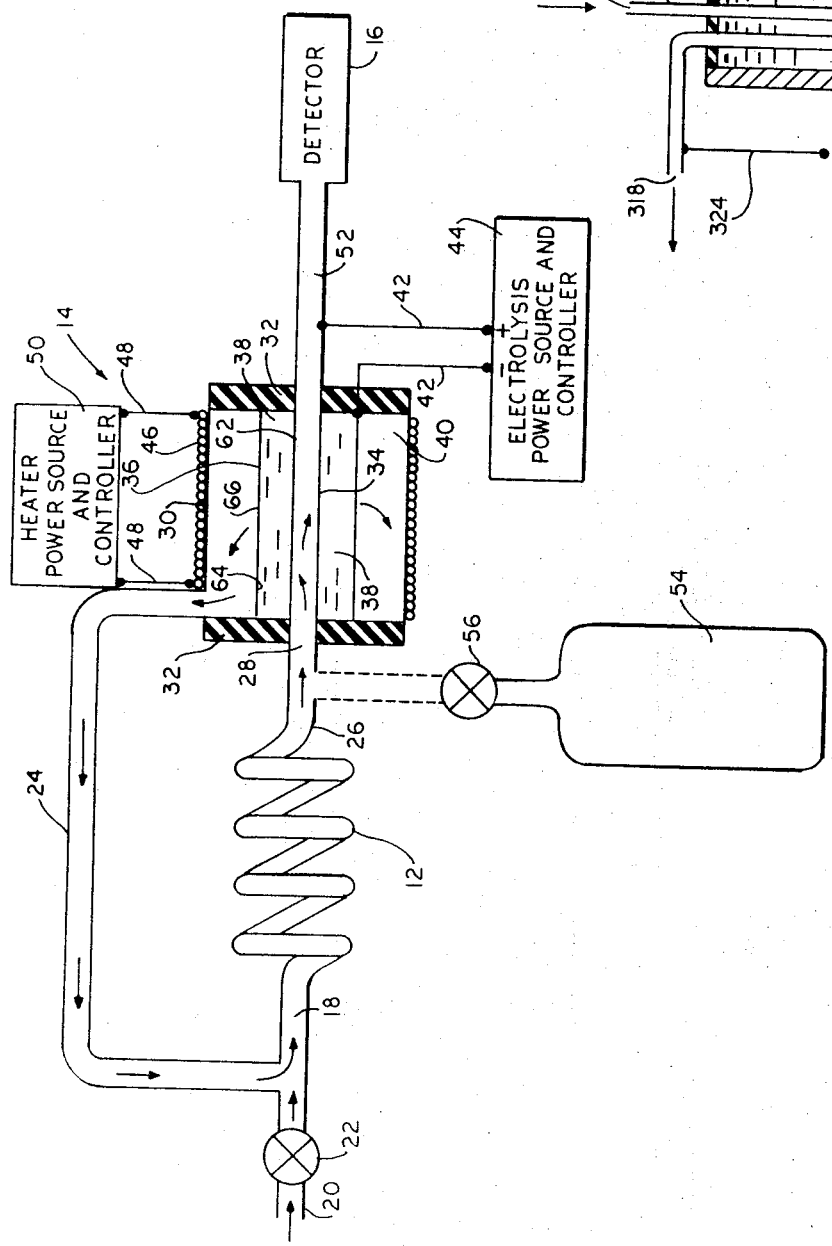

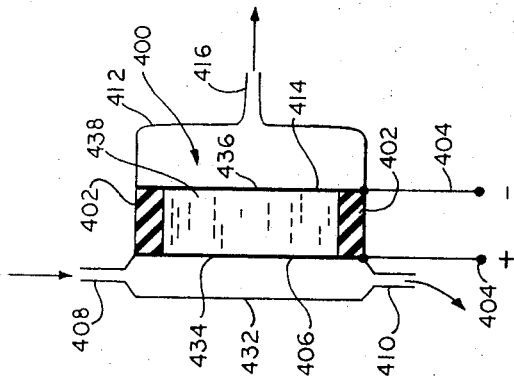
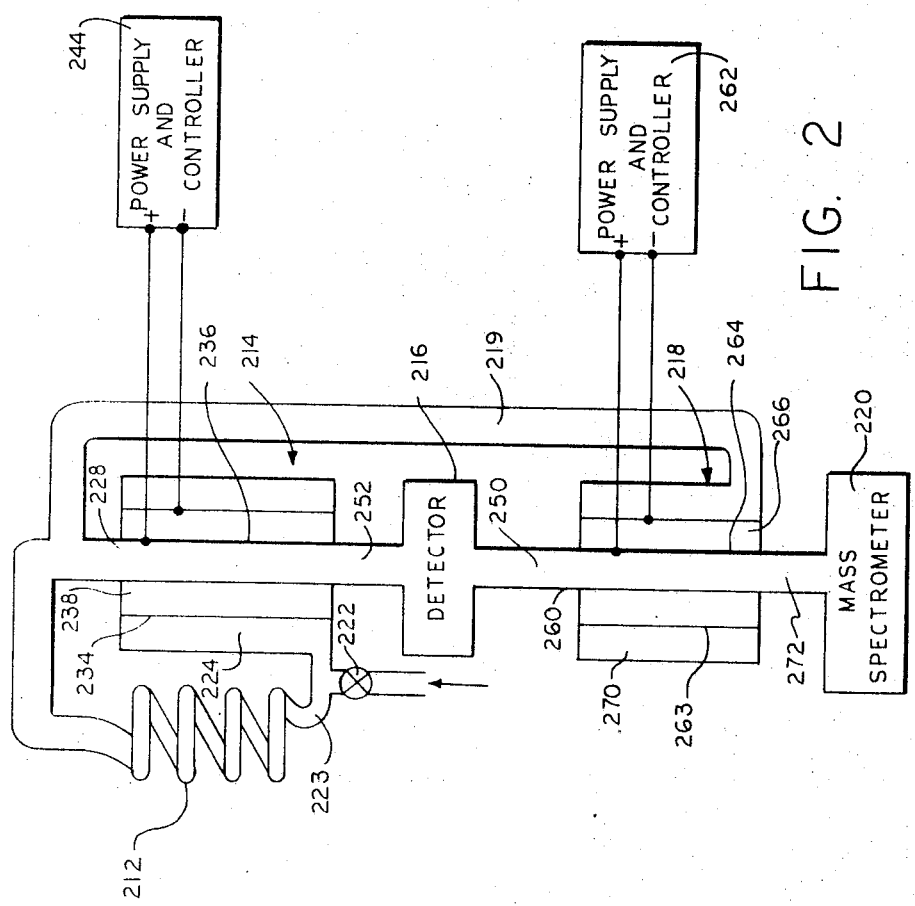

---

3,835,019
COMBINED ELECTROLYTIC HYDROGEN GAS SEPARATOR AND GENERATOR FOR GAS CHROMATOGRAPHIC SYSTEMS
James E. Lovelock, Bowerchalke, England, assignor to California Institute of Technology, Pasadena, Calif.
Original application Feb. 2, 1970, Ser. No. 7,922, now Patent No. 3,690,835. Divided and this application Apr. 12, 1972, Ser. No. 243,500
Claims priority, application Great Britain, Mar. 6, 1969, 12,003/69
Int. Cl. C22d 3/02
U.S. Cl. 204—246                10 Claims

ABSTRACT OF THE DISCLOSURE

A combined hydrogen gas separator and generator device comprising a pair of this palladium film membrane electrodes separated by an aqueous hydroxide electrolyte. On application of an electrolytic current to the films heated to a temperature of at least 150° C., hydrogen is selectively transferred through the first film, across the body of electrolyte as protonic hydrogen and is regenerated as diatomic hydrogen on the outside surface of the second film. The impurities in the hydrogen inlet stream collect at the outside surface of the first film. The concentrated impurities can be sent to a detector for analysis. The regenerated hydrogen can be recycled to operate a separator unit such as a gas chromatographic column.

---

This is a division of application Ser. No. 7,922, filed Feb. 2, 1970 now Pat. No. 3,690,835.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

The present invention relates to apparatus and methods for analyzing gas samples and, more particularly, to a compact and efficient system for analysis of separated constituents of micro-sized samples.

2. Description of the Prior Art

Analysis of complex samples of matter is greatly facilitated by gasifying the sample and then passing it in gasified form through a separation device such as a gas chromatograph which separates the components of the sample into sequential analytical components. In a gas chromatograph and other separation apparatus, gas or vapor sample to be analyzed is transported through the various functional parts of the apparatus by a stream of inert carrier gas. While this procedure facilitates automation of analysis, it does however introduce other problems.

Thus, sample constituents present in minute quantities are so greatly diluted by the much larger quantity of carrier gas necessary for operation of the chromatograph column that they may be difficult or impossible to detect. Furthermore, the pressure and flow rate of the effluent emerging from the chromatograph may exceed the capability of a detector such as a mass spectrometer.

Various approaches to interfacing a gas chromatograph to a detector have been suggested, such as scaling down the dimensions of the chromatograph to suit the needs of the detector, interfacing the chromatograph and the detector with a capillary column or by the use of various plastic membranes or a fritted glass surface to separate carrier gas before introduction of the effluent into the detector. None of these approaches have been entirely satisfactory.

A much improved technique is disclosed in copending applications Serial No. 852,690 filed Aug. 25, 1969, now Pat. No. 3,638,396; Ser. No. 852,825 filed Aug. 25, 1969, now Pat. No. 3,589,171; and Ser. No. 852,770 filed Aug. 25, 1969 now Pat. No. 3,638,397. In these applications the chromatographic column is interfaced to the detector with a carrier gas transfer device such as a palladium tube which is utilized to totally and selectively remove hydrogen carrier gas from the effluent from the chromatographic column. Optionally, a second carrier gas, such as helium, impermeable to the tube can be introduced at the inlet to the device alone or in combination with a controlled amount of hydrogen to provide a constant flow rate of effluent through the detector.

However, these systems still require the use of heavy carrier gas cylinders and essential valving to supply and meter the carrier gas to the device. Furthermore, the use of high pressure storage cylinders of combustible gases such as hydrogen may create hazards to personnel and to the mission of airborne vehicles carrying such cylinders.

A system is disclosed in Serial No. 852,825 in which it is proposed to separately generate hydrogen carrier gas by electrolysis of water. The hydrogen carrier gas is converted to water by feeding oxygen to the container surrounding the palladium valve tube. This water is fed to the reservoir of the electrolysis unit which electrolytically decomposes the water into separate streams of hydrogen and oxygen. Since the functions of separation and gas generation are physically unrelated and separated, it is difficult to maintain the system in stoichiometric balance and the heat generated by the electrolysis unit must be dissipated and is not utilized for the thermal requirements of the apparatus.

For spacecraft use, and particularly for planetary landers, bulk and weight limitations and power constraints make it of utmost importance that the instrumentation provided be compact, of minimal weight and economical in its power requirements.

SUMMARY OF THE INVENTION

In accordance with the invention, a substantial power saving and an extremely compact arrangement is effected by combining the carrier gas separation function with the gas generation function in a unitary structure. The arrangement, according to the invention, utilizes a pair of spaced membranes formed of a material which is selectively permeable to the carrier gas under the conditions of operation and capable of acting as opposed electrodes.

The membranes are separated by an electrolyte and on application of electric potential of suitable polarity between the membranes the carrier gas is selectively transferred through the wall of the first membrane, is transported to the second membrane and is regenerated therethrough as pure carrier gas. The gas output from the first side of the membrane will contain concentrated sample which can be sent to a detector while the output of pure carrier gas from the second membrane can be recycled to a separation device such as a gas chromatograph column. The output from the column is returned to the first side of the first membrane for separation of carrier gas preliminary to detection of sample.

These and many other attendant advantages of the invention will become apparent as the invention becomes better understood by reference to the following detailed description when considered in conjunction with the accompanying drawings.

BRIEF DESCRIPTION OF THE DRAWINGS

FIG. 1 is a schematic view of a first embodiment of an analysis system according to the invention;

FIG. 2 is a further embodiment of a closed cycle analysis system according to the invention;

FIG. 3 is a sectional view of a further embodiment of a combined gas transfer and generator device; and FIG. 4 is a further schematic view of a combined gas generator and separator.

DESCRIPTION OF THE PREFERRED EMBODIMENTS

The first embodiment of an analytical system according to the invention as illustrated in FIG. 1 generally includes a chromatographic column 12, a combined carrier gas transfer and generator device 14 and a detector 16. Sample is introduced to the inlet 18 to the column 12 through a sample inlet 20 containing a valve 22.

The column 12 consists of a series of reactants which segregate the gas sample by affecting the rate at which the different constituents of the gas sample flow through the column to provide an effluent containing a sequential passage of the components. As the sample is introduced through the sample introduction valve 22 it is mixed with a first carrier gas which is introduced into the inlet 18 at a constant pressure and flow rate from recycle conduit 24. The mixture of first carrier gas and sample leaves the column through an outlet 26 which communicates with the inlet 28 to the device 14.

The device 14 comprises an outer cylindrical casing 30 closed by cylindrical electrical insulator end plates 32. The end plates 32 support a set of coaxial cylinders comprising an inner tubular anode membrane 34 which is surrounded by an outer tubular cathode membrane 36. The annular space between the anode 34 and cathode 36 is filled with an electrolyte 38 capable of transporting an ionic species of the first carrier gas under the conditions of operation. The outer chamber 40 between the casing 30 and the cathode 36 serves as a collection chamber for first carrier gas as will be described.

Electrical leads 42 are connected to the anode 34 and cathode 36 and to an electrolysis power source and controller 44. An insulated heating coil 46 may be placed in thermal contact with the outer casing 30. The ends of the coil 46 are connected through electrical leads 48 to a heater power source and controller 50.

The first carrier gas may be hydrogen of high purity and the transfer device may then comprise a thin film of conductive material selectively permeable to hydrogen. Palladium and its alloys are remarkably permeable to hydrogen as long as the film is maintained at a temperature above about 100° C. to 150° C. The film is suitably maintained at temperatures below 600° C. to avoid unnecessary rearrangement of components subject to catalytic hydrogenation or rearrangement in the presence of heated palladium.

Pure palladium when subject to temperature cycling in the presence of hydrogen, suffers mechanical distortions. However, an alloy of palladium containing 10% to 30% silver, preferably about 25% silver is as permeable to hydrogen and is mechanically stable. Other palladium alloys, for example, palladium-rhodium alloys may confer more resistance to corrosion to the films and extend the useful life of the generator-separator. The palladium tube may be provided in various configurations and lengths of tubing may be connected in parallel to provide increased surface area with less flow resistance. Membranes or tubes can also be formed from a base structural material such as a porous ceramic coated with a thin film of palladium or a suitable hydrogen permeable palladium alloy.

The hydrogen flux for a given hydrogen pressure difference through a thin film of palladium or alloy is dependent on tube geometry, wall thickness and wall temperature. The flux of hydrogen through the wall of a palladium-25 silver alloy tube having an internal diameter of 0.0152 centimeter and a wall thickness of 0.0076 centimeter and a length of 25 centimeter varies with temperature as the tube is heated in air from 0.2 ml. sec.$^{-1}$ at 200° C. to 0.45 ml. sec.$^{-1}$ at 450° C. Further experiments have demonstrated that it is possible to maintain an active open barrier between hydrogen gas at ambient pressure and a hard vacuum with the use of the hydrogen gas separator transfer device utilizing heated palladium films.

To maintain the palladium film at a temperature at which it is permeable to hydrogen the cell may be heated by various means such as by disposing it in an oven or by heating the device electrically. For example, the heating coil 46 may be utilized to raise the tubes 34 and 36 and the electrolyte 38 to a temperature above 200° C. Though it is desirable to maintain the resistance of the electrodes and electrolyte as low as possible for purposes of electrical power efficiency, the electrolytic cell may in some configurations provide a sufficient internal impedance to produce the desired heating on passage of current through the electrodes and electrolyte. In other configurations, the heat supplied by operation of the electrolytic cell contributes to the heat received to maintain the films at the desired temperature. Thus, the electrolysis current supplied by the electrolysis power and controller unit 44 may also be utilized to provide a portion of the necessary heating.

Removal of hydrogen at currents higher than a limiting value results in hydrogen generation at the cathode greater than hydrogen separation through the anode. The controller 44 should be set a current lower than the limiting value to maintain the electrolytic cell in stoichiometric balance. At a given temperature and current, the hydrogen removal capacity is fairly constant. By providing an excess hydrogen flow through the interior of the anode tube 34, a low controlled residual flow of hydrogen mixed with the sample leaves the device 14 through the outlet 52.

When operated in the mode resulting in complete removal of carrier gas, the propulsive means needed to convey the enriched, segregated sample constituent through the detector 16 may be eliminated. This could result in recombination of segregated sample constituents. In this mode of operation it is preferable to introduce a second carrier gas to the inlet 28 to the device 14 from supply cylinder 54 containing a regulating valve head 56. The second carrier gas enters the system at a point after the column 12 but before the device 14. The tubular membranes 34 and 36 are selected to be permeable to the first carrier gas but not to any other gas so that as the mixed carrier stream passes through the device 14 the first carrier gas is eliminated through the walls of the device and the sample components are left suspended in the second carrier or scavenge gas. The concentrated stream is then swept into the detector 16. A suitable second carrier gas is helium. Further control of the flow rate of helium may be provided by diluting the helium with first carrier gas as disclosed in co-pending application Ser. No. 852,770, now Pat. No. 3,638,397.

However, in accordance with the invention, it is possible to dispense with the second carrier gas supply. This is accomplished by supplying excess hydrogen to the system cell in such a manner that hydrogen separation capacity is not sufficient to totally remove the hydrogen carrier gas. Thus, a controlled, small residual flow of hydrogen gas could be utilized to sweep the segregated constituents through the detector.

The electrolyte is a material capable of transporting an ionic species of the carrier gas from one electrode to the other, is inert with respect to the electrodes, is stable at the temperature of operation and is capable of regenerating the carrier gas by electrolytic association or disassociation as is required. The electrolyte may be an acid, basic or salt material and is preferably an inorganic metal hydroxide.

The most suitable material for use in the invention are the Group I metal hydroxides such as sodium hydroxide, potassium hydroxide, or lithium hydroxide. The hydroxides should be utilized in a hydrated form, preferably contain 10 to 35% water of hydration since this both lowers the power requirement and the temperature at which the electrolyte becomes molten. Improved operation of the cell occurs when at least 10 to 25% of the lighter weight lithium hydroxide is mixed with sodium or potassium hydroxide, preferably the latter. Commercial potassium hydroxide containing 25% water melts at 275° C. The addition of 10% lithium hydroxide to this electrolyte further lowers the temperature at which the electrolyte becomes molten to about 200° C.

The coaxial anode 34 and cathode 36 having molten aqueous electrolyte disposed therebetween acts as an electrolytic cell for the disassociation of water. Diatomic hydrogen gas contacting the inside surface 60 of the anode tube 34 will disassociate and be transported through the tube wall as protonic hydrogen, $H^+$. At the outside surface 62 of the anode tube 34 the hydrogen protons combine with hydroxyl ion, $OH^-$ to form water. The water is transported through the electrolyte 38 to the inside suface 64 of the cathode tube 36. At the surface 36 the water is electrolytically disassociated into hydroxyl ions and protons. The hydrogen protons transfer through the tube wall 36.

On the outside surface 66 of the cathode tube 36 the hydrogen protons recombine to form diatomic hydrogen, $H_2$, the diatomic hydrogen collects in the collection chamber 40. Under the applied electrolytic potential, hydrogen can build up in chamber 40 to a pressure as high as approximately 700 p.s.i. which drives the hydrogen through the recycle tube 24 to the junction with the sample inlet 18 of the gas chromatographic system 12. The mixed gasified sample is then swept through the column 12 by the recycle hydrogen.

After passage through the column 12, the gas mixture emerges through outlet 26 and enters the inlet 28 to the device 14. If the temperature of the wall of tube 34 is below the critical diffusion level, the entire gas mixture including the hydrogen carrier gas will enter detector 16. However, if the temperature of tube 34 exceeds a temperature of about 150° C., the hydrogen in the mixture will diffuse through the wall of tube 34 and be removed from the sample stream.

Control of the temperature of the tube wall, the electrical potential of the cell and the amount of excess hydrogen in the system makes it possible to control the amount of hydrogen removed from the mixture. Since this control can now be effected electrically, mechanical valving and a source of secondary carrier gas becomes unnecessary. Furthermore, the molten electrolyte provides a supply of hydroxyl ions which acts as a driving force to increase the flow of hydrogen through the wall of anode tube 34 and this further obviates the need to carry a supply of oxygen previously disclosed to act as a driving force for hydrogen removal as disclosed in the above referenced co-pending applications. Since the temperature of the molten electrolyte and the electrical potential applied to the cell also affect cathode tube 36 in the same manner, it is apparent that the amount of gas evolved into the collection chamber 40 will be at a proportional rate, thus balancing carrier gas separation with carrier gas generation.

The ionic and water content of the electrolyte is also maintained constant during operation. The $OH^-$ ion which is liberated on decomposition of water as the cathode recombines with the $H^+$ ions entering the system to form water which maintains the hydration concentration of the electrolytic cell constant. For this reason it is preferred to maintain an excess of hydrogen protons in the system at all times to prevent the formation of molecular oxygen which will cause bubbles in the electrolyte and excessive pressure on the thin wall electrode tubes.

The fused electrolyte utilized, must be very pure to provide continuous trouble free operation. The initial supply of hydrogen carrier gas should also be pure to avoid analytical error. It is important to maintain the temperature of the anode tube above the critical diffusion temperature so that a sufficient supply of hydrogen is maintained in the electrolyte at all times. It is also desirable that the tube be activated prior to assembling the cell and is preferable that metals other than palladium, silver or gold not be present in the cell.

Trace quantities of other metals such as formed from brazed connections would provide nuclei about which hydrogen could evolve. This will be evidenced by the presence of hydrogen bubbles within the mass of the electrolyte. It is desirable that the hydrogen be generated only at the cathode wall for most efficient diffusion through the palladium membrane. Further assurance of prevention of oxygen generation can be provided by priming the system with free hydrogen before start-up so that hydroxyl ions are favored and any oxygen present in the system can be recombined immediately. When the cell is operating properly there should be no bubbling or change in composition of the electrolyte.

A combined transfer-generator device was constructed utilizing 1/16th inch, 0.005 inch wall palladium-25 silver alloy tubing for the anode and 0.02 inch OD, 0.005 inch wall palladium-25 silver alloy tubing for the coaxial cathode. The electrolyte was a 10% lithium hydroxide-90% potassium hydroxide (25% water) mixture. The efficiency of this configuration was excellent. Only 30 to 70 millivolts of potential were required to generate a given quantity of hydrogen for use as a carrier gas compared to 1550 millivolts when hydrogen was not flowing in the separator portion of the device. The power needed to produce hydrogen can be at least 10 times less than that required by the usual methods of electrolytic decomposition of water.

The device could deliver 6.6 ml. per minute and completely remove it again. The hydrogen flow can be removed through the device within 2 seconds of the receipt of a signal by raising the potential applied to the anode which is immersed in molten alkali at 240° C. The flow rises from 0 to 6.6 ml. per minute in 2.4 seconds. The overall configuration is very compact and the heat provided by the electrolytic cell maintains the electrolyte molten, raises the tubes to the minimum critical diffusion temperature and the leakage heat from the cell can also be utilized to heat the chromatographic column to improve its operation.

The detector 16 may be a conventional colligative property sensor utilized in gas chromatographic systems such as a thermal conductivity, ionization cross-section or gas-density balance detector which determines the identity and amount of each segregated constituent flowing from the column. These detectors usually operate at atmospheric pressure and have no means of pumping sample through the detector. Therefore, to maintain the system closed and in stoichiometric balance, it is preferred to operate the system with a supply of secondary carrier gas from cylinder 54, and with the carrier gas transfer-generator device 14 operating at maximum hydrogen removal efficiency. With a detector such as a mass spectrometer having its own source of vacuum for introducing sample into the detector, the system need not be operated with a source of secondary carrier gas.

With the combined hydrogen transfer-generator device, according to the invention, the quantity of hydrogen removed can exactly equal that generated. In a closed system the metered carrier gas can in such arrangement be the excess hydrogen in the system. The excess hydrogen gas can conveniently be fully regenerated in a small additional generator-separator device. The excess hydrogen gas will leave the first generator-separator at a controlled flow rate.

Referring now to FIG. 2, a closed cycle analysis system incorporating both a conventional gas chromatographic column detector and a mass spectrometer is illustrated. The system includes a column 212, a first coaxial carrier gas transfer-generator device 214, a detector 216, a second carrier gas transfer-generator device 218, and a mass spectrometer 220.

A vapor sample such as that derived from a pyrolysis unit, not shown, is introduced through sample inlet 210 containing a valve 222 to the inlet 223 of the column 212. The sample mixes with hydrogen gas being generated and collected in chamber 224, of the device 214. The mixed carrier gas-sample stream flows through the column 212 and enters the inlet 228 of the device 214. At the inlet 228 the mixed carrier gas stream merges with the hydrogen being recycled from the second device 218 through conduit 219.

The power source 244 is set at a level to provide a constant metered flow of hydrogen leaving the outlet 252 of the device 214. As the gases flow through anode tube 236, substantially all the hydrogen will be transferred through anode tube 236, electrolyte 238 and cathode tube 240 such that the transferred hydrogen collects in chamber 224 and operates the column 212. The remaining excess hydrogen leaves the device through outlet 252 and carries the sample through the detector 216. The output from the detector 216 flows through outlet 250 into the inlet 260 to the secondary transfer-generator device 218. The secondary power source and controller 262 supplies sufficient current and heat to transfer all of the secondary hydrogen through the anode 264, molten electrolyte 266 and coaxial outer cathode 268 such that the hydrogen collects in the outer chamber 270. The collected hydrogen is transferred through tube 219 back to the first transfer device 214 as previously explained. The remaining sample is drawn through outlet pipe 272 into the mass spectrometer 220.

The analysis apparatus of FIG. 2 can be operated without a mass spectrometer in which case the sample exiting through tube 272 can simply be exhausted from the system. Since the transfer-generator device of the invention can totally remove hydrogen from the system, by simply varying the ratio of the power being applied by the power source and controllers 244 and 262, the flow rate through the detector 216 can be varied.

Another configuration of the structure of the electrolytic cell is illustrated in FIG. 3. In FIG. 3, the combined carrier gas transfer-generator device 314 comprises a container 300 having a lid 302 formed of an electrically insulating material which is stable at the temperature of operation of the cell. A body of electrolyte 338 is received within the container 300. An anode 334 and a cathode 336 penetrate the lid 302 and have portions immersed within the body of electrolyte 338.

The anode 334 is in the form of a thin wall tube, suitably fabricated of a palladium-silver alloy having an open input end 316 and an open output end 318. The cathode 336 is in the form of a thin wall tube having a closed end 320 immersed within the electrolyte 338 and an open end 322 extending from the device. Electrical leads 324 are connected to the anode 334 and cathode 336 and to a variable power source and controller, not shown.

In the operation of the device of FIG. 3, an impure hydrogen stream is fed into the inlet 316 to the cathode tube 334 and the controller is set to maintain the temperature of the system above about 200° C. The body of electrolyte 338 melts under these conditions and hydrogen diffuses through the walls of tube 334 across the body of electrolyte 338 separating the anode 334 and cathode 336 and traverses the wall of the cathode 336. The hydrogen leaves the device 314 through the cathode outlet 322. The impurities present in the hydrogen stream exit as a concentrated stream through the anode outlet 318. The combined transfer-generator device can be used in a closed cycle system as illustrated above or may be used to concentrate or recover selected impurities or to purify hydrogen.

A further version of the combined transfer-generator device is illustrated in FIG. 4. In the embodiment of FIG. 4, the compartment 400 for the electrolyte 438 is formed of two side walls of thin sheets of palladium-silver alloy and the end walls 402 are formed of electric insulating material. The side walls are connected by electric leads 404 to a variable power source and controller, not shown. When the side walls are connected in the polarity illustrated, the left hand wall functions as an anode 434 and the right hand wall functions as a cathode 436.

A flow-through chamber 432 is formed adjacent the outside surface 406 of the anode 434, the anode forming one wall of the chamber 432. The chamber has an inlet 408 and an outlet 410. A collection chamber 412 is formed adjacent the outside surface 414 of the cathode 438. The cathode 438 forms one wall of the chamber 412. The chamber 438 is provided with a gas outlet 416.

The impure hydrogen stream or hydrogen carrier gas containing a minor amount of vaporous sample to be separated is introduced into inlet 408. The power source and controller is set to a level to melt the electrolyte and to heat the electrode palladium films 434 and 436 to a temperature of at least 200° C. The hydrogen in the inlet stream traverses anode film 434, is transported through the electrolyte to the cathode film 436 and traverses the cathode and collects in collection chamber 412. Pure hydrogen is removed through outlet 416. The impurities or vaporous sample collect in chamber 432 and are removed through outlet 410.

An extremely compact arrangement is effected according to the invention by combining a hydrogen gas transfer device with a hydrogen generator in a unitary structure. The power requirement is substantially reduced and the waste heat provided by the electrolysis is utilized to maintain the walls of the palladium separator at operating temperature. The extremely efficient separation of hydrogen provided by the device results in a marked gain in sensitivity and more accurate analysis. The device can be effectively coupled with an ambient pressure detector and/or with a detector operating under high vacuum such as a mass spectrometer.

Since the temperature of the molten electrolyte can be chosen to be compatible with that required by the palladium membranes for hydrogen diffusion, only a single source of heat is required to operate both the generator and the separator. Further, since the electrolysis current may also be used as the heating current in some circumstances only a single source of power is required.

The combined transfer-generator device of the invention makes possible the construction of an extremely compact, portable gas chromatograph or gas chromatograph-mass spectrometer system since the device supplies its own source of pure hydrogen carrier gas for operating both the column and the mass spectrometer. The flow rate of the carrier gas can be controlled at a programmed variable rate without resorting to the use of valves or other mechanical aids. This control is effected simply by appropriate choice of the geometry and capacity of the generator-separator and by controlling the electrical power supplied to the electrodes. In a portable apparatus there is a savings in bulk weight and power requirements and the hazards associated with the use of high pressure storage cylinders are avoided.

The hydrogen transfer-generator devices makes possible the long sought goal of a twenty pound combined gas chromatographic-mass spectrometer system for planetary missions where data on composition of planetary soils and atmospheres is being sought. The device will also find use aboard satellites and other aerospace vehicles for analysis of atmosphere and especially in smog control. The device will find commercial application whenever a very lightweight gas chromatograph is required for gas or vapor analysis.

It is to be realized that only preferred embodiments of the invention have been disclosed and that numerous substitutions, alterations and modifications are all permissible without departing from the spirit and scope of the invention as defined in the following claims.

What is claimed is:

1. A combined, electrolytic, hydrogen gas separator-generator device comprising:

a first palladium electrode film impermeable to gases at a temperature no more than a first temperature and selectively permeable to hydrogen gas at a temperature above the first temperature and having a first and second surface;

a second palladium electrode film impermeable to gases at a temperature no more than a first temperature and selectively permeable to hydrogen gas at a temperature above the first temperature and having a first and second surface;

chamber means including a pair of spaced insulators defining a closed chamber between said first surfaces;

a body of electrolyte molten at said first temperature received in said chamber in contact with said first surfaces and capable of electrolytically transporting hydrogen gas between said first surfaces;

first compartment means enclosing said second suface of the first electrode;

inlet means for supplying a gas stream containing impurity gas and a portion of hydrogen gas to the first compartment;

first outlet means for removing said impurity gas from the first compartment;

second compartment means enclosing the second surface of the second electrode for collecting hydrogen gas;

second outlet means for removing hydrogen gas from the second compartment;

contact means applied to each electrode for impressing an electric potential across said electrodes and electrolyte to form an electrolytic cell;

heating means for heating said electrode films to said first temperature to render said films selectively permeable to hydrogen gas; and potential source means connected to said electrodes so as to transfer hydrogen through said first electrode, across said electrolyte, through said second electrode and collect in said second compartment.

2. A device according to Claim 1 in which the films comprise an alloy of palladium and silver.

3. A device according to Claim 2 in which the electrode films are in the form of tubes.

4. A device according to Claim 3 in which the tubes have a portion immersed in the body of the electrolyte and a portion extending therefrom.

5. A device according to Claim 3 wherein said tubes are of different diameters and further include a pair of insulating end members supporting said tubes in a coaxial configuration defining an annular chamber for receiving said electrolyte.

6. A device according to Claim 5 in which said electrolyte is molten at the operating condition of the device.

7. A device according to Claim 6 in which the electrolyte is an inorganic hydroxide.

8. A device according to Claim 7 in which the electrolyte is a Group I metal hydroxide.

9. A device according to Claim 8 in which the electrolyte contains up to 10% of lithium hydroxide.

10. A device according to Claim 8 in which the electrolyte contains 10 to 35% water.

References Cited

UNITED STATES PATENTS

| | | | |
|---|---|---|---|
| 3,180,762 | 4/1965 | Oswin | 136—86 |
| 3,148,089 | 9/1964 | Oswin | 136—86 |
| 3,489,670 | 1/1970 | Maget | 204—129 |
| 3,448,035 | 6/1969 | Serfass | 204—272 |
| 3,188,283 | 6/1965 | Cole | 204—277 |

JOHN H. MACK, Primary Examiner

W. I. SOLOMON, Assistant Examiner

U.S. Cl. X.R.

55—158; 204—60, 129, 247, 272, 274, DIG 3